US007098942B1

(12) United States Patent
Nihei

(10) Patent No.: US 7,098,942 B1
(45) Date of Patent: Aug. 29, 2006

(54) IMAGE CAPTURE SYSTEM AND METHOD OF CONTROLLING OPERATION OF SAME

(75) Inventor: Kaname Nihei, Asaka (JP)

(73) Assignee: Fuji Photo Film Co., Ltd., Minami-Ashigara (JP)

(*) Notice: Subject to any disclaimer, the term of this patent is extended or adjusted under 35 U.S.C. 154(b) by 678 days.

(21) Appl. No.: 09/628,003

(22) Filed: Jul. 28, 2000

(30) Foreign Application Priority Data

Jul. 28, 1999 (JP) ................................ 11-212983

(51) Int. Cl.
*H04N 5/225* (2006.01)
*H04N 5/222* (2006.01)
*G03B 15/00* (2006.01)
*G06F 17/00* (2006.01)

(52) U.S. Cl. .......................... 348/207.99; 348/333.02; 705/500; 396/2

(58) Field of Classification Search ................ 348/158
See application file for complete search history.

(56) References Cited

U.S. PATENT DOCUMENTS

| | | | | |
|---|---|---|---|---|
| 5,060,171 | A * | 10/1991 | Steir et al. | 345/630 |
| 5,623,581 | A * | 4/1997 | Attenberg | 396/2 |
| 5,897,220 | A * | 4/1999 | Huang et al. | 396/2 |
| 5,913,019 | A * | 6/1999 | Attenberg | 358/1.18 |
| 6,078,848 | A * | 6/2000 | Bernstein et al. | 700/237 |
| 6,198,544 | B1 * | 3/2001 | Wess et al. | 358/296 |
| 6,209,011 | B1 * | 3/2001 | Vong et al. | 708/112 |
| 6,229,904 | B1 * | 5/2001 | Huang et al. | 382/100 |
| 6,275,882 | B1 * | 8/2001 | Cheever et al. | 710/302 |
| 6,298,197 | B1 * | 10/2001 | Wain et al. | 396/2 |
| 6,369,908 | B1 * | 4/2002 | Frey et al. | 358/1.15 |
| 6,385,628 | B1 * | 5/2002 | Massarsky | 715/502 |
| 6,429,892 | B1 * | 8/2002 | Parker | 348/77 |
| 6,529,644 | B1 * | 3/2003 | Ito et al. | 382/309 |
| 6,539,162 | B1 * | 3/2003 | Stephenson | 348/39 |
| 6,750,988 | B1 * | 6/2004 | Ghislain Bossut et al. | 358/488 |
| 2001/0011262 | A1 * | 8/2001 | Hoyt et al. | 707/1 |
| 2001/0056362 | A1 * | 12/2001 | Hanagan et al. | 705/7 |

OTHER PUBLICATIONS

Gary Hoffman, IEEE 1394: A Ubiquitous Bus, Mar. 1995, COMPCON '95, □□□□http://www.skipstone.com/compcon.html.*

* cited by examiner

*Primary Examiner*—David Ometz
*Assistant Examiner*—Nhan Tran
(74) *Attorney, Agent, or Firm*—Birch, Stewart, Kolasch, and Birch, LLP

(57) ABSTRACT

An image capture system is provided with a USB terminal to which a drive is connected. When a user drops a coin into a coin insertion slot, the fact that the user intends to use the system is verified. As a result, a message to the effect that image data can be read using the drive is displayed on the display screen of a display unit. By observing the display on the display screen, the user can ascertain that the drive has been added onto the image capture system.

9 Claims, 8 Drawing Sheets

IMAGE CAPTURE SYSTEM AND METHOD OF CONTROLLING OPERATION OF SAME

BACKGROUND OF THE INVENTION

1. Field of the Invention

This invention relates to an image capture system having an image capture unit for capturing image data representing an image, a display unit for displaying the image captured by the image capture unit, and a recording control unit for executing at least one of processing for recording the image data, which has been captured by the image capture unit, on a portable recording medium and processing for recording an image represented by the image data, which has been captured by the image capture unit, on a visible recording medium.

2. Description of the Related Art

An image capture system which photographs a subject and prints an image representing the image of the subject on a seal or the like has become commercially practical. An image capture system of this kind also is capable of reading image data that has been recorded on a portable recording medium brought by a user and of printing the image represented by the read image data.

To achieve this, the image capture system is provided with a memory-card drive, a floppy-disk drive and a film scanner as input equipment for capturing image data that has been recorded on a portable recording medium, and with a printer as output equipment for printing out an image represented by image data.

These items of input and output equipment are incorporated in the image capture system as devices that construct the image capture system. When a new input or output device is incorporated in an image capture system that has already been completed, the image capture system must be rebuilt from the beginning.

DISCLOSURE OF THE INVENTION

Accordingly, an object of the present invention is to make it possible to connect a new input/output device to an image capture system in comparatively simple fashion and to give notification of the fact that the new input/output device has been connected.

According to the present invention, the foregoing object is attained by providing an image capture system having an image capture unit (image capture means) for capturing image data representing an image, a display unit for displaying the image captured by the image capture unit, and a recording control unit (recording control means) for executing at least one of processing for recording the image data, which has been captured by the image capture unit, on a portable recording medium and processing for recording an image represented by the image data, which has been captured by the image capture unit, on a visible recording medium, the system comprising: a hot-pluggable input/output interface to which an input/output unit can be connected; a command input unit for applying a use verification command which verifies use of the image capture unit; a determination unit (determination means) for determining whether the input/output unit has been connected to the input/output interface; and a notification unit for giving notification that input/output of an image by an input/output unit connected to the input/output interface is possible when the use verification command has been applied from the command input unit and the determination unit has determined that the input/output unit has been connected, and for giving notification that an input/output unit can be connected to the input/output interface when the determination unit has determined that the input/output unit has not been connected.

The present invention provides also a method suited to the system described above. Specifically, the present invention provides a method of controlling operation of an image capture system having an image capture unit for capturing image data representing an image, a display unit for displaying the image captured by the image capture unit, and a recording control unit for executing at least one of processing for recording the image data, which has been captured by the image capture unit, on a portable recording medium and processing for recording an image represented by the image data, which has been captured by the image capture unit, on a visible recording medium, the method comprising the steps of: providing a hot-pluggable input/output interface to which an input/output unit can be connected; detecting whether a use verification command which verifies use of the image capture unit has been applied; determining whether the input/output unit has been connected to the input/output interface; and giving notification that input/output of an image by an input/output unit connected to the input/output interface is possible when the use verification command has been detected and it has been determined that the input/output unit has been connected, and giving notification that an input/output unit can be connected to the input/output interface when it has been determined that the input/output unit has not been connected.

Since the input/output interface has been provided in accordance with the present invention, the input/output unit can be connected without turning off the power supply of the image capture system.

In accordance with the present invention, whether or not the use verification command has been entered and whether or not an input/output unit has been connected to the input/output interface are verified. If the use verification command is entered, the image capture system regards this as indicating that the user intends to use the system.

When it is determined that the input/output unit has been connected, notification is given of the fact that an image can be input/output by the input/output unit that has been connected to the input/output interface. In accordance with such notification, the user can input or output an image using the input/output unit that has been connected to the input/output interface.

When it is determined that the input/output unit has not been connected, notification is given of the fact that an input/output unit can be connected to the input/output interface. The user is notified of the fact that an input/output unit can be connected to the input/output interface and is capable of inputting or outputting an image using the input/output unit connected to the input/output interface.

The command input unit may be a verification unit for verifying that at least part of a user fee for using the image capture system has been paid. Since this makes it possible to verify payment of at least part of a user fee, unauthorized use can be prevented.

Examples of the portable recording medium are a floppy disk, a CD-ROM and a memory card. Examples of the visible recording medium are a photograph, film, etc.

The input/output unit includes an input unit, an output unit and a unit capable of both input and output.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENT

A preferred embodiment of an image capture system according to the present invention will be described with reference to the drawings.

Figure 1:
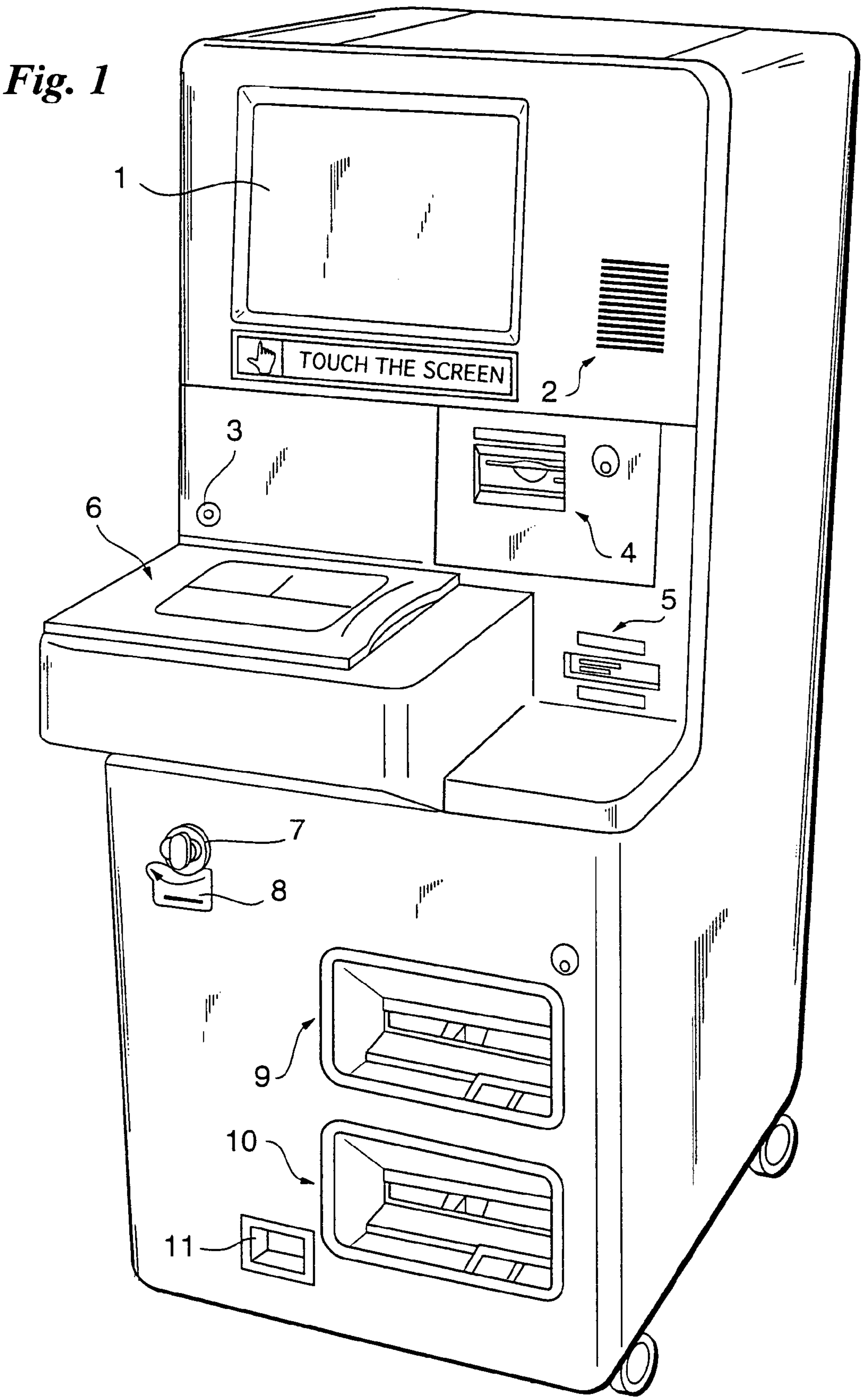
FIG. 1 is a perspective view of an image capture system according to a preferred embodiment of the present invention.

FIG. 1 illustrates the external appearance of the image capture system. The user operates the system while standing in front of it.

The image capture system captures image data that has been recorded on a portable recording medium and prints out the image represented by the captured image data. Image data can also be recorded on a portable recording medium.

Provided on the front side of the system at the upper part thereof is a display unit 1 on which read images and other information are displayed. Provided to the right of the display unit 1 is a speaker 2 for furnishing the user of the image capture system with operating instructions in the form of a voice output.

A floppy-disk drive insertion slot 4 for inserting a floppy disk is formed at the lower right of the display unit 1. A memory-card insertion slot 5 is formed below the floppy-disk drive insertion slot 4.

A flat-bed scanner 6 having a horizontally provided flat bed is disposed on the left side of the memory-card insertion slot 5 substantially at the center of the front side of the image capture system.

The front side of the image capture system is formed to have a USB (Universal Serial Bus) terminal 3 slightly above the flat-bed scanner 6. The USB terminal 3 is a hot-pluggable terminal. Such a terminal 3 allows a drive for inputting/outputting image data to be connected and disconnected while the power supply of the image capture system is left on.

Provided below the flat-bed scanner 6 are a coin insertion slot 8 for allowing a user to pay a user fee using the image capture system, and a coin return knob 7 operated by the user when a coin that has been dropped into the coin insertion slot 8 is to be returned. The returned coin is discharged from a coin return opening 11 formed in the lower part of the image capture system.

Print discharge ports 9 and 10 are formed in the lower right side of the image capture system. Prints of images that have been captured by the image capture system are discharged from the print discharge ports 9 and 10. The image capture system has two internal printers that can print images on two sheets of paper and discharge these prints at the same time. It goes without saying, however, that the system may be provided with only one printer.

Figure 2:
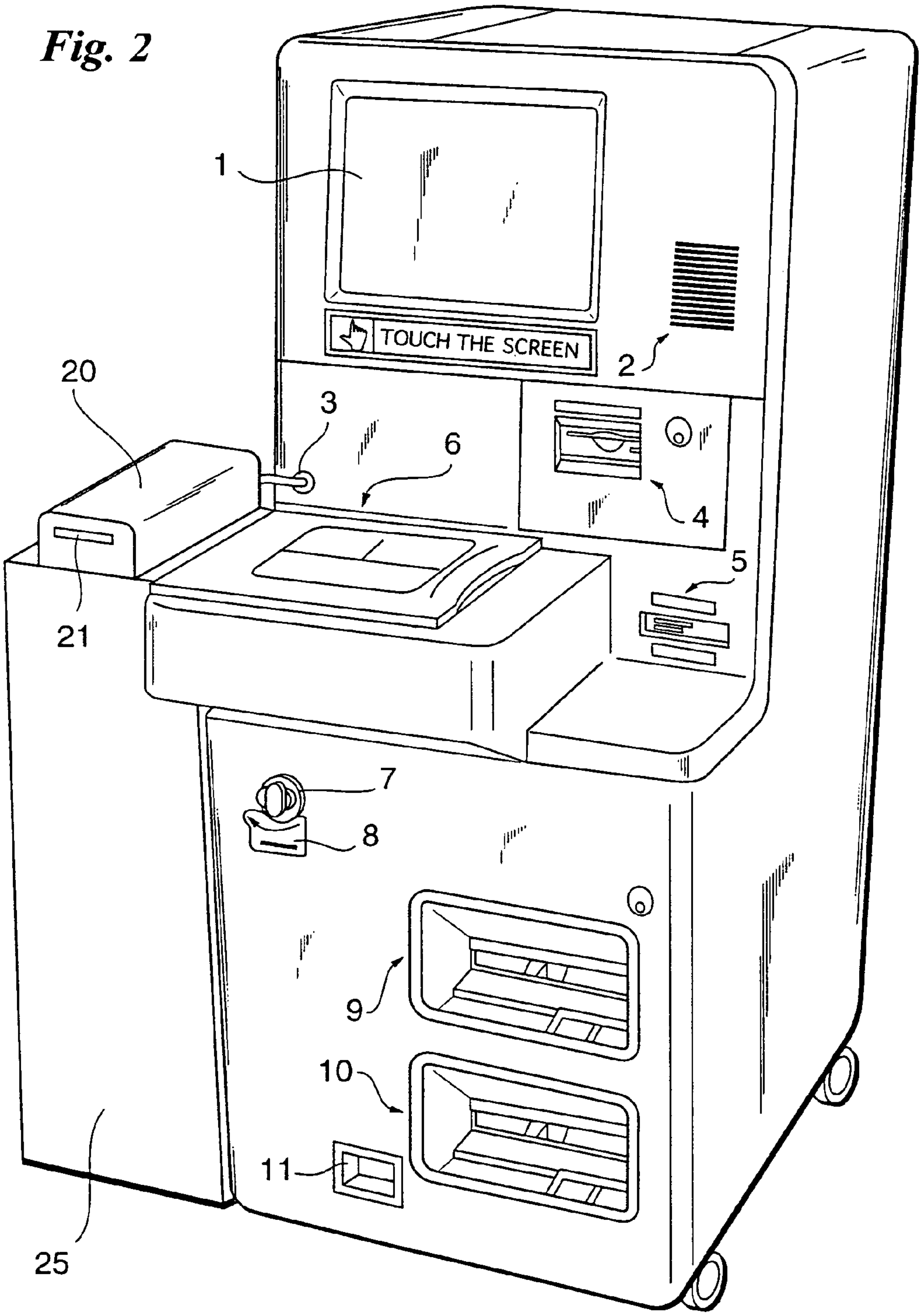
FIG. 2 is a perspective view of the image capture system to which an additional drive has been connected.

FIG. 2 shows the manner in which an additional drive is connected to the image capture system.

A base 25 is situated on the left side of the image capture system. A drive (the additional drive) 20 is placed upon the base 25. The front side of the drive 20 is formed to have an insertion slot 21 for inserting a recording medium. The drive 20 in FIG. 2 has been connected to the image capture system by the USB terminal 3.

Thus, a drive other than the drives incorporated within the image capture system can be added on in a comparatively simple manner.

Figure 3:
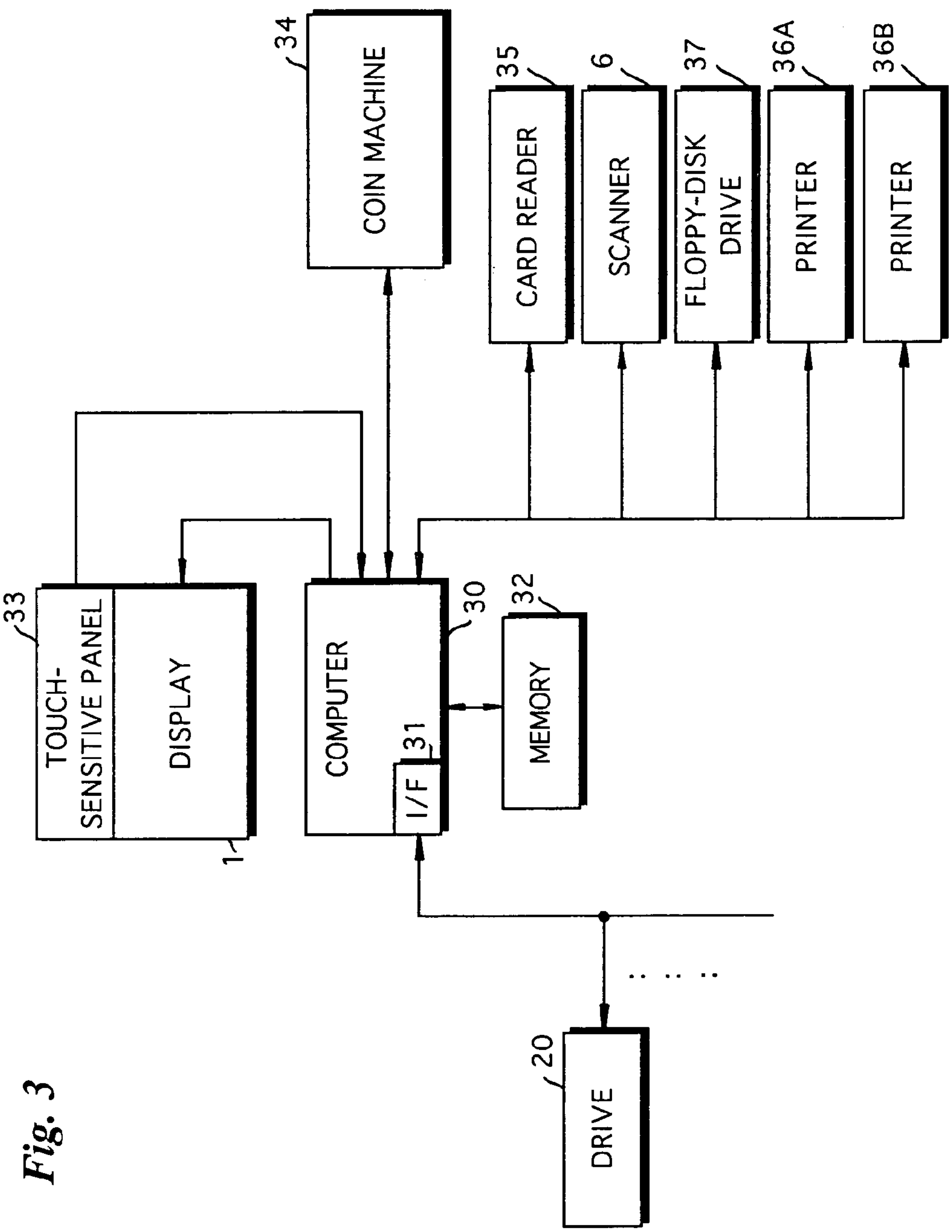
FIG. 3 is a block diagram illustrating the electrical construction of the image capture system.

FIG. 3 is a block diagram illustrating the electrical construction of the image capture system. This diagram shows the system in a state in which the additional drive 20 has been connected to the system.

The image capture system includes the computer 30, which controls the overall operation of the image capture system.

A memory 32 for storing various data is connected to the computer 30. Image data representing an image to be displayed on the display screen of the display unit 1 has been stored in the memory 32. Image data (R, G, B image data) that has been read out of the memory 32 is applied from the computer 30 to the display unit 1 and the image represented by this image data is displayed on the display screen.

The display screen of the display unit 1 is formed to have a touch-sensitive panel 33. In response to being touched, the touch-sensitive panel 33 inputs a signal indicative thereof to the computer 30.

Connected to the image capture system are a card reader 35 for reading a memory card inserted from the memory-card insertion slot 5 in the manner described earlier, and a floppy-disk drive 37 for reading a floppy disk inserted from the floppy-disk drive insertion slot 4. Image data that has been read by the card reader 35 and floppy-disk drive 37 is applied to the computer 30 and is stored temporarily in memory 32.

The image capture system includes printers 36A and 36B, each of which prints images. Paper that has been printed on by printer 36A or 36B is discharged from the print discharge port 9 or 10 as mentioned earlier.

The image capture system further includes a coin machine 34 which confirms that a coin has been dropped into the coin insertion slot 8.

The computer 30 is provided internally with a hot-pluggable interface 31 to which the USB terminal 3 has been connected. The interface 31 connects the drive 20 to the image capture system.

Figure 4:
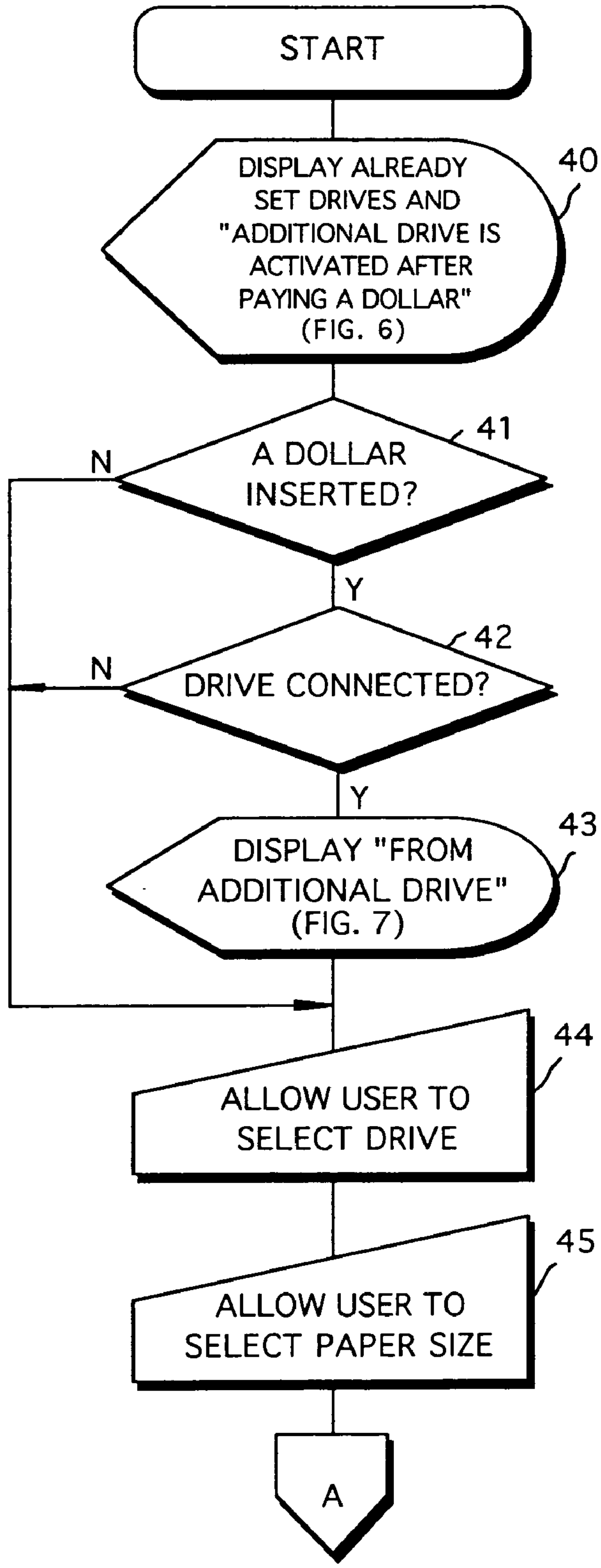
FIGS. 4 and 5 are flowcharts illustrating part of the processing executed by the image capture system.
Figure 5:
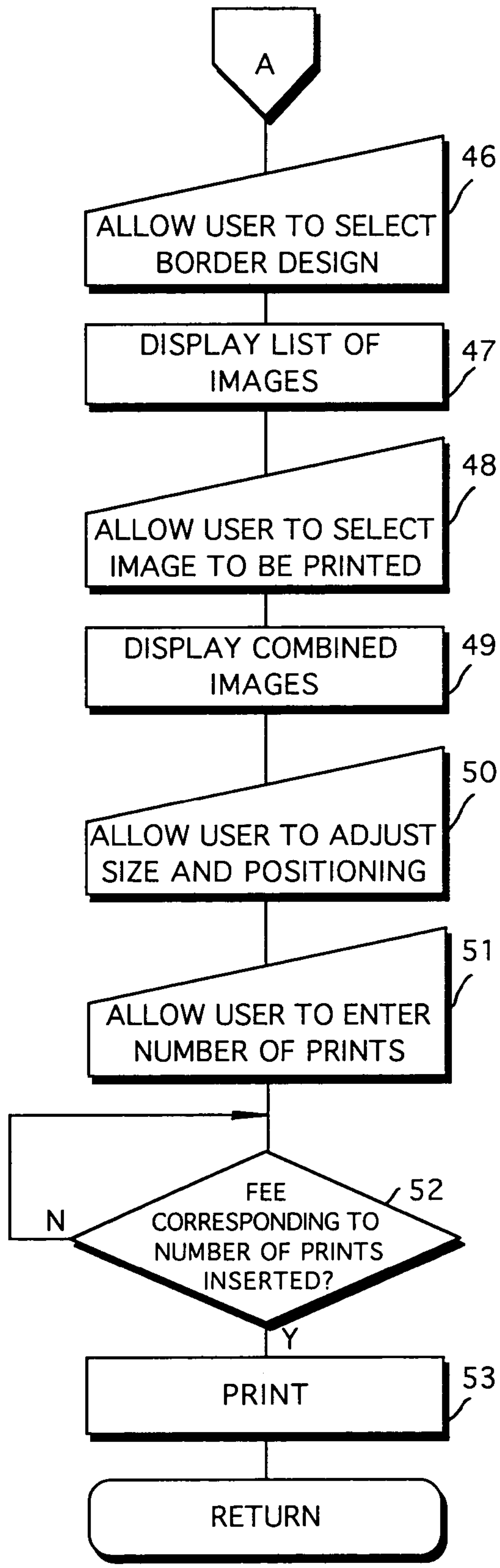
Figure 6:
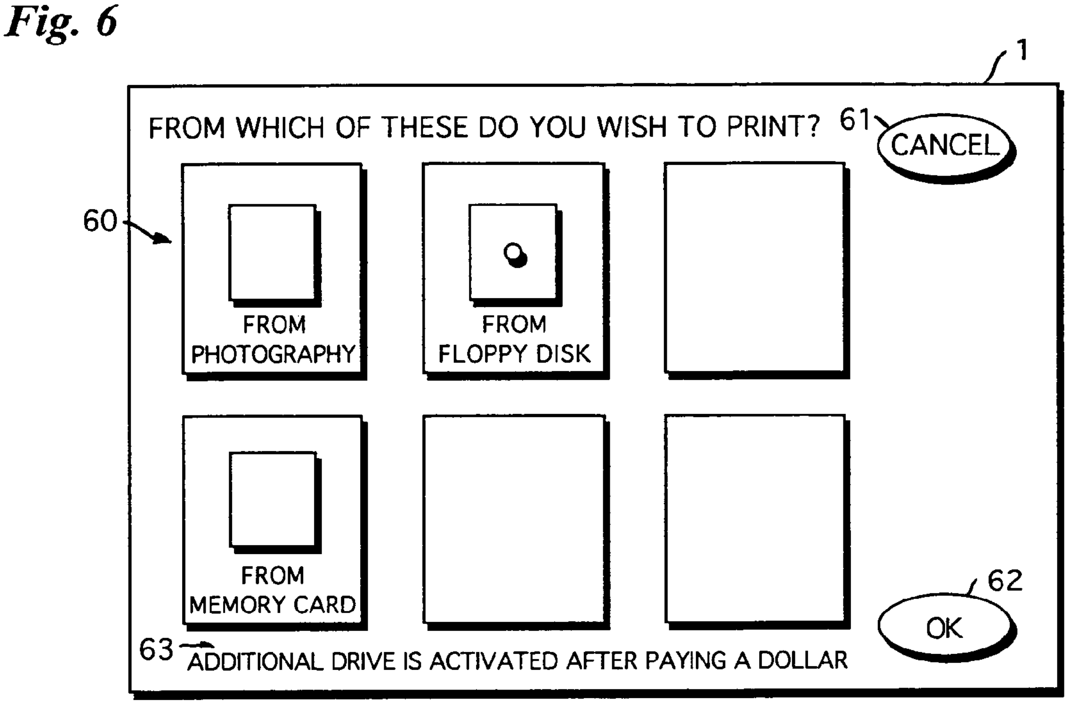
FIGS. 6 and 7 illustrate examples of display screens on a display unit of the image capture system.
Figure 7:
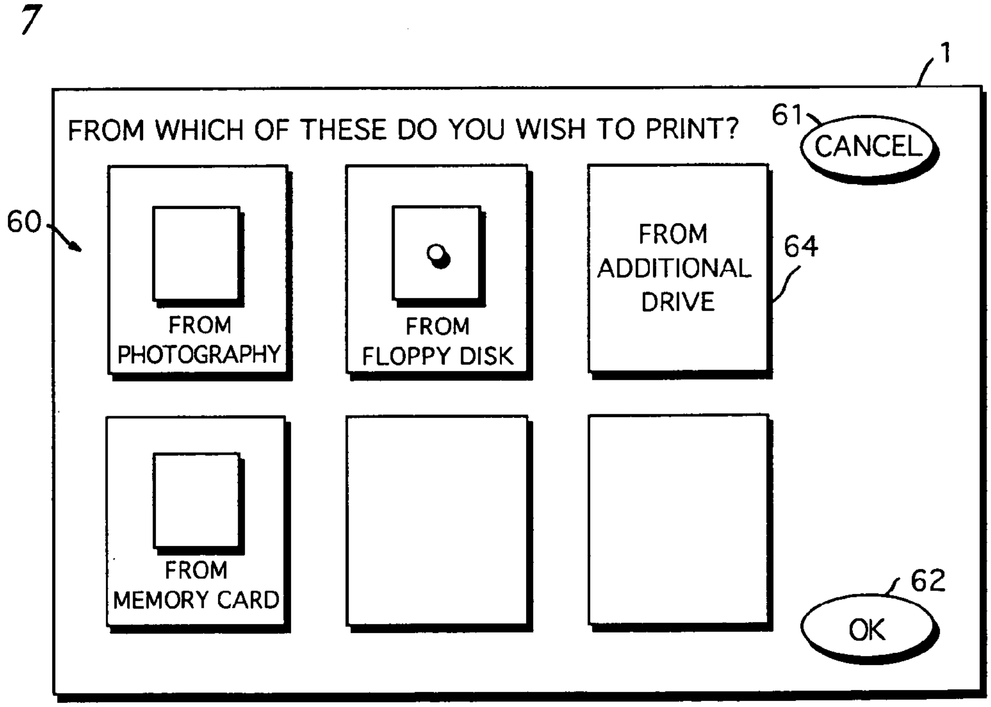

FIGS. 4 and 5 are flowcharts illustrating processing executed by the image capture system, and FIGS. 6 and 7 show examples of display screens on the display unit 1 of the image capture system. It is assumed in these examples that the drive 20 has already been connected to the image capture system.

If the power supply of the image capture system is turned on, the image shown in FIG. 6 is displayed on the display unit 1 of the image capture system (step 40). Initially set drives incorporated within the image capture system are displayed in an area 60 of the display screen on display unit 1, and text reading "ADDITIONAL DRIVE IS ACTIVATED AFTER PAYING A DOLLAR" is displayed in an area 63 of the display screen.

The initially set drives in the image capture system according to this embodiment are the above-mentioned scanner 6, floppy-disk drive 37 and card reader 35. Blocks which allow the user to designate from which drive an image is to be read are displayed in the area 60. These blocks include a block displaying text reading "FROM PHOTOGRAPH", a block displaying text reading "FROM FLOPPY DISK" and a block displaying text reading "FROM MEMORY CARD".

When an image appearing on a photograph is to be read by the scanner 6, the user touches the block displaying the text "FROM PHOTOGRAPH". When an image that has been stored on a floppy disk is to be read by the floppy-disk drive 37, the user touches the block displaying the text "FROM FLOPPY DISK". When an image that has been stored on a memory card is to be read by the card reader 35, the user touches the block displaying the text "FROM MEMORY CARD".

The display screen of the display unit 1 includes also an area 61 touched by the user when image capture processing is to be halted, and an "OK" area 62.

Whether or not a dollar coin has been dropped into the coin insertion slot 8 is checked by the coin machine 34 (step 41). If a dollar coin has been dropped into the image capture system, this is taken as verification of the fact that the user intends to use the image capture system. Since the system thus recognizes that it is not merely being tampered with, the computer 30 determines whether the drive 20 has been connected (step 42). If the drive 20 has been connected, text reading "FROM ADDITIONAL DRIVE" newly appears in a block 64 in the area 60 on the display screen of the display unit 1 (step 43), as shown in FIG. 7. The user thus can tell that the additional drive 20 is available and that it can be used.

The desired block among the blocks in the area 60 is touched by user (step 44). When the desired block has been touched, the user then touches the "OK" area 62 in order to confirm that use will be made of the drive appearing in the touched block.

When this is done, the display screen of the display unit 1 changes over to a paper-size selection screen. Using the paper-size selection screen, the user selects the size of the paper on which images are to be printed (step 45).

When paper size is selected, the display screen of the display unit 1 changes over to a border-design selection screen. Using the border-design selection screen, the user selects the design of the border that is to surround each image (step 46).

Next, an image or image data is read out by the selected drive and read images or images represented by the read image data are displayed on the display screen of the display unit 1 in the form of a list (step 47). The user touches the image that is to be printed from among the images displayed in the list, whereby the print image is selected (step 48).

The image data representing the selected image is applied to the computer 30. Image data representing the border of the selected design is read out of the memory 32 and applied to the computer 30. The latter combines the border image with the image that has been selected. Data representing the combined images is applied to the display unit 1, whereby the composite image is displayed (step 49).

The size of the selected image (the image represented by the image data read out of the drive selected by the user) constituting the composite image displayed on the display unit 1 and the positional relationship between this image and the border image are adjusted by the user (step 50). In order to perform this adjustment, up, down, left and right arrow buttons for positioning and an enlargement/reduction button are displayed on the display screen of the display unit 1 and the user touches these buttons to decide positioning and size.

When positioning and size have been decided, an image for entering the number of prints is displayed on the display screen of the display unit 1. The number of prints is entered by the user using this image for entering the number of prints (step 51).

When the number of prints has been entered, the computer 30 calculates the user fee in accordance with the entered number of prints and selected paper size. The calculated fee is displayed on the display screen of the display unit 1. The user then drops coins into the coin insertion slot 8 in an amount corresponding to the displayed fee (step 52). If a dollar coin has already been inserted, then the difference between the user fee and dollar is displayed.

When the coin machine 34 verifies that coins corresponding to the calculated user fee have been dropped into the coin insertion slot 8, the composite image is printed by the printer 6 (step 53).

Figure 8:
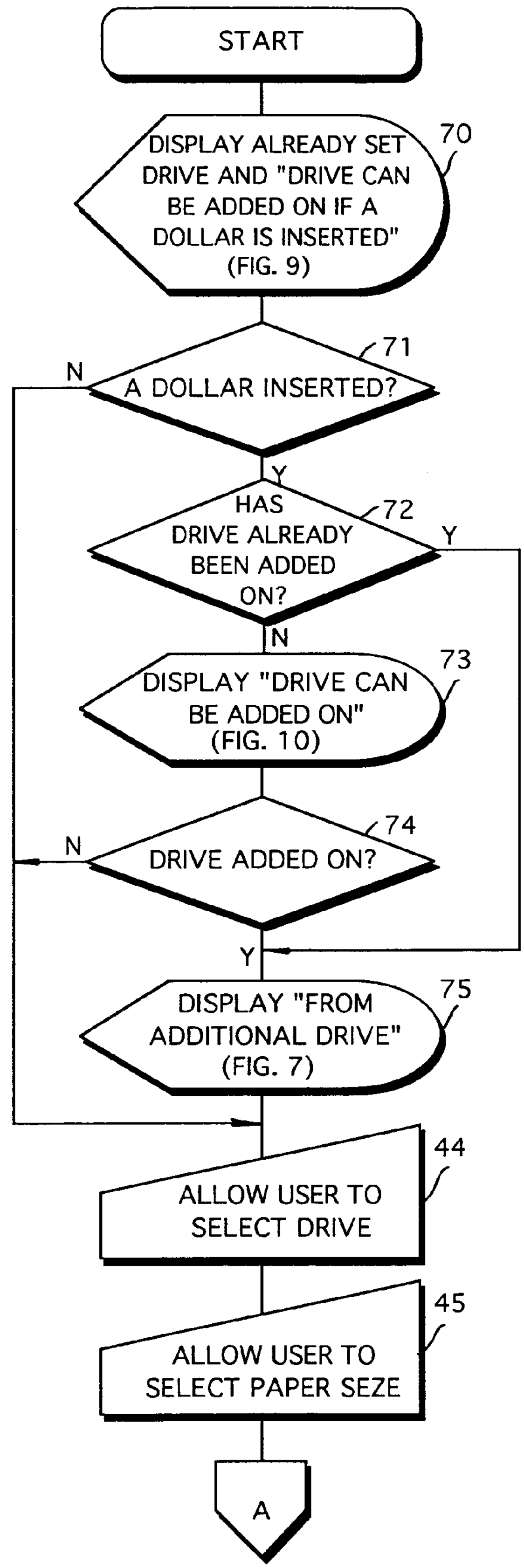
FIG. 8 is a flowchart illustrating part of the processing executed by the image capture system.
Figure 9:
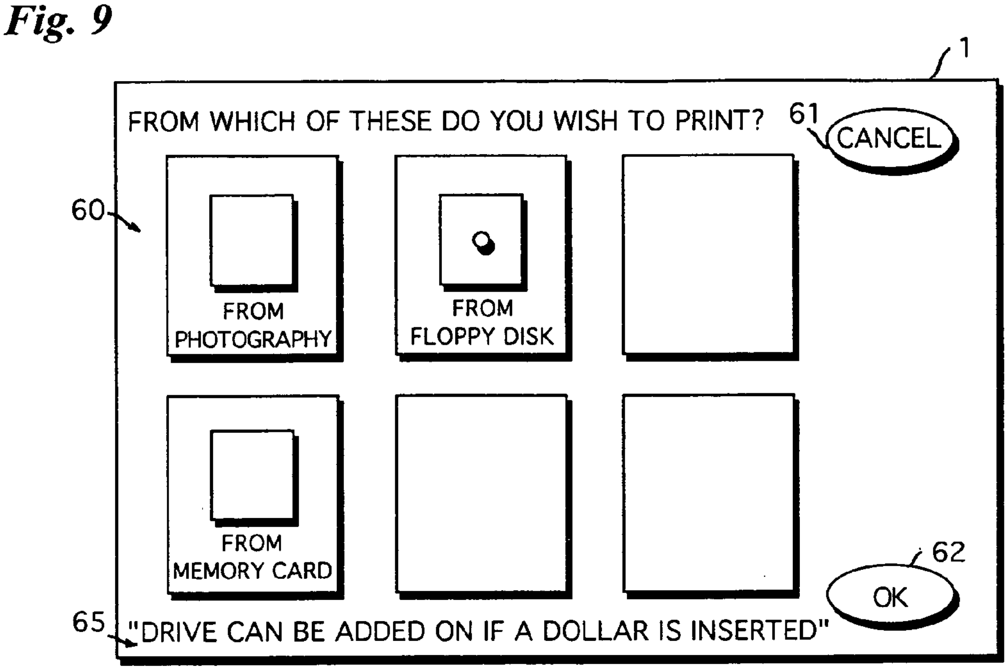
FIGS. 9 and 10 illustrate examples of display screens on a display unit of the image capture system.
Figure 10:
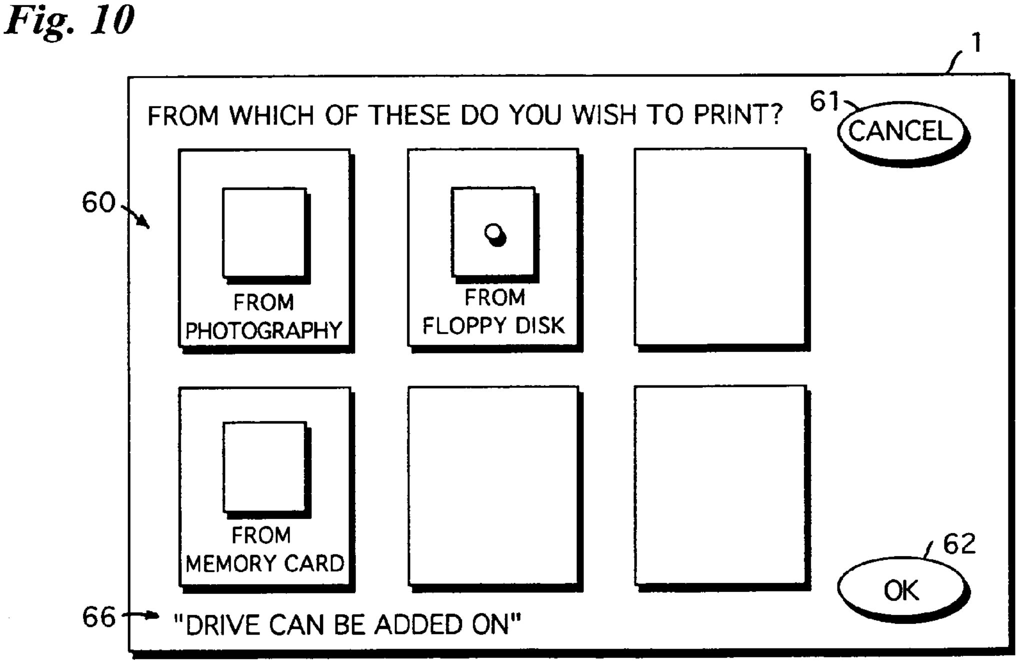

FIG. 8 is a flowchart illustrating part of the processing executed by the image capture system. Processing steps in FIG. 8 identical with those shown in FIG. 4 are designated by like step numbers and need not be described again. FIGS. 9 and 10 show examples of display screens displayed on the display unit 1 of the image capture system. Areas and blocks on the screens shown in FIGS. 9 and 10 that are identical with the areas and blocks shown in FIGS. 6 and 7 are designated by like reference characters and need not be described again.

The example depicted in FIGS. 8 to 10 is one in which a drive is added on after the power supply of the image capture system is turned on.

When the power supply of the image capture system is turned on, "DRIVE CAN BE ADDED ON IF A DOLLAR IS INSERTED" is displayed in the area 65 of the display screen on the display unit, as shown in FIG. 9 (step 70). By observing this display, the user can tell that it is possible to add a drive to the image capture system.

If a dollar is dropped into the coin insertion slot 8 by the user ("YES" at step 71), it is determined whether the drive has already been added on (step 72). If the drive has not been added on ("NO" at step 72), then "DRIVE CAN BE ADDED ON" is displayed in an area 66 of the display screen on display unit 1 (step 73), as shown in FIG. 10. The user thus recognizes that the system is in a state in which the drive can be added on.

The cable of the additional drive is connected to the USB terminal 3 of the image capture system and the drive is added onto the system (step 74). This operation would be carried out by an employee of the store where the image capture system has been installed.

If the drive has already been added on ("YES" at step 72), then the processing of steps 73 and 74 is skipped.

When the drive is added onto the image capture system, the block 64 indicating that image data can be read from the additional drive is displayed on the display unit 1, as shown in FIG. 7. This makes it possible for the user to select the additional drive from the block 64 newly displayed.

Thus, a drive other than drives initially incorporated within the image capture system can be added onto the system and image data can be read by this additional drive. Further, an output unit such as a printer can be connected to the USB terminal 3. This makes it possible to add on a printer having a desired resolution.

As many apparently widely different embodiments of the present invention can be made without departing from the spirit and scope thereof, it is to be understood that the invention is not limited to the specific embodiments thereof except as defined in the appended claims.

What is claimed is:

1. An image capture system having an image capture unit for capturing image data representing an image, a display unit for displaying the image captured by the image capture unit, and a recording control unit for executing processing for recording the image data, which has been captured by the image capture unit, from a portable recording medium and processing for recording an image represented by the image data, which has been captured by the image capture unit, from a visible recording medium, said system comprising:

one or more detachable input/output units that is able to capture the image data from the portable recording medium;

a hot-pluggable input/output interface to which one of the one or more input/output units can be connected;

a command input unit for applying a use verification command which verifies use of the image capture unit;

a determination unit for determining upon payment by a user of a predetermined monetary value whether a desired input/output unit from the one or more input/output units has been connected to said input/output interface; and a notification unit for giving notification to the user prior to the payment of the monetary value that one of the one or more input/output units can be added to the system and upon payment of the predetermined monetary value giving notification that input/output of the image by the desired input/output unit upon connection to said input/output interface is possible when the use verification command has been applied from said command input unit and said determination unit has determined that the input/output unit has been connected, and for giving notification that the desired input/output unit can be connected to said input/output interface when said determination unit has determined that the input/output unit has not been connected and notifying the user when the system is in a ready state to add the input/output unit.

2. The system according to claim 1, wherein said command input unit is a verification unit for verifying that at least part of a user fee for using the image capture system has been paid.

3. The system according to claim 1, further comprising selection means for selecting capturing image data from the image capture unit or capturing image data from the input/output unit when said determination unit has determined that the input/output unit has been connected, wherein said system captures image data in response to the selection by said selection means.

4. The system according to claim 1, wherein said notification unit gives notification that an input/output unit can be connected to said input/output interface, regardless of the use verification command given from said command input unit, when said determination unit has determined that the input/output unit has not been connected.

5. The system according to claim 1, wherein said notification unit displays a sentence of notification on said display unit.

6. The image capture system of claim 1, wherein the input/output unit is able to input image data and output image data.

7. A method of controlling operation of an image capture system having an image capture unit for capturing image data representing an image, a display unit for displaying the image captured by the image capture unit, and a recording control unit for executing processing for recording the image data, which has been captured by the image capture unit, from a portable recording medium and processing for recording an image represented by the image data, which has been captured by the image capture unit, from a visible recording medium, said method comprising the steps of:

providing a hot-pluggable input/output interface to which an input/output unit can be detachably connected, the input/output unit able to capture said image data from said portable recording medium and said visible recording medium;

detecting whether a use verification command which verifies use of the image capture unit has been applied;

determining upon payment by a user of a predetermined monetary value whether a desired input/output unit from the one or more input/output units has been connected to said input/output interface; and giving notification to the user prior to the payment of the monetary value that one of the one or more input/output units can be added to the system and upon payment of the predetermined monetary value giving notification that input/output of the image by the desired input/output unit upon connection to said input/output interface is possible when the use verification command has detected and it has been determined that the input/output unit has been connected, and giving notification that the desired input/output unit can be connected to said input/output interface when it has been determined that the input/output unit has not been connected and notifying the user when the system is in a ready state to add the input/output unit.

8. The method of claim 7, wherein the input/output unit is able to input image data and output image data.

9. An image capture system having an image capture unit for capturing image data representing an image, a display unit for displaying the image captured by the image capture unit, and a recording control unit for executing processing for recording the image data, which has been captured by the image capture unit, from a portable recording medium and processing for recording an image represented by the image data, which has been captured by the image capture unit, from a visible recording medium, said system comprising:

an input/output unit that is able to capture said image data and output said image data from the visible recording medium;

a hot-pluggable input/output interface to which the input/output unit can be connected;

a command input unit for applying a use verification command which verifies use of the image capture unit;

a determination unit for determining upon payment by a user of a predetermined monetary value whether a desired input/output unit from the one or more input/output units has been connected to said input/output interface; and a notification unit for giving notification to the user prior to the payment of the monetary value that one of the one or more input/output units can be added to the system and upon payment of the predetermined monetary value giving notification that input/output of the image by the desired input/output unit upon connection to said input/output interface is possible when the use verification command has been applied from said command input unit and said determination unit has determined that the input/output unit has been connected, and for giving notification that the desired input/output unit can be connected to said input/output interface when said determination unit has determined that the input/output unit has not been connected and notifying the user when the system is in a ready state to add the input/output unit.

* * * * *